INVENTOR.
CARL LUDWIG
BY
McNENNY, FARRINGTON, PEARNE & GORDON

ATTORNEYS

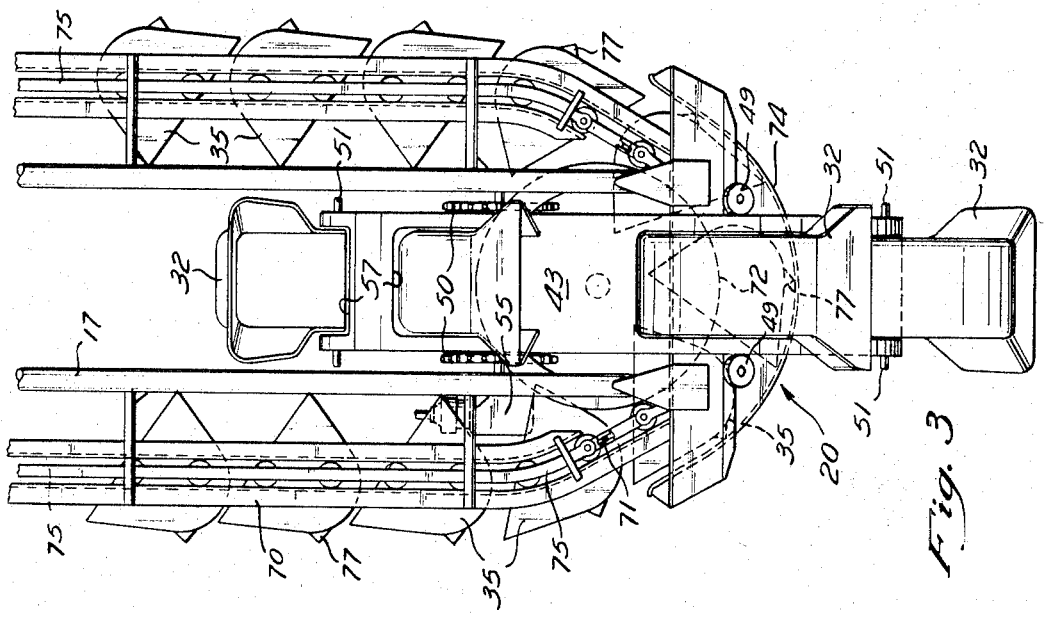
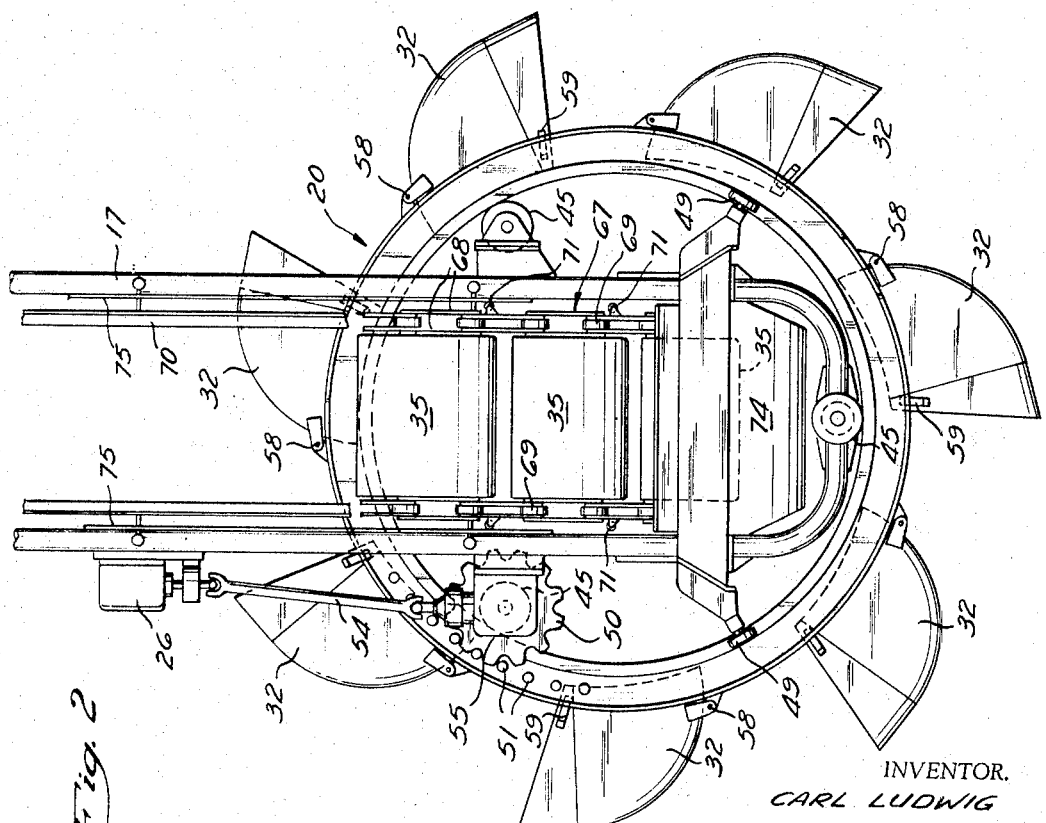

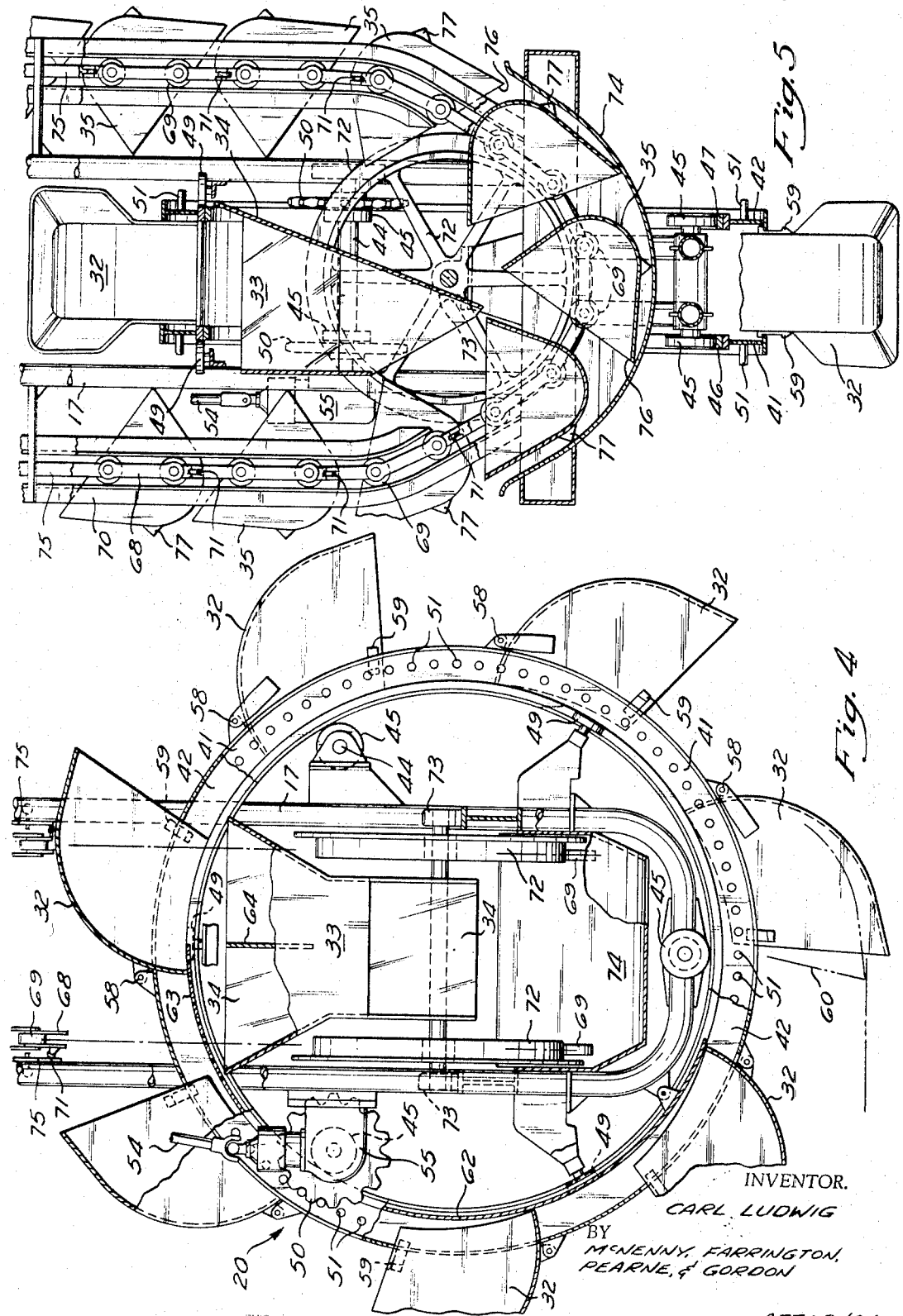

United States Patent Office 3,432,024
Patented Mar. 11, 1969

3,432,024
BULK MATERIAL HANDLING APPARATUS WITH ROTARY DIGGING DEVICE
Carl Ludwig, Cleveland, Ohio, assignor to McDowell Wellman Engineering Company, Cleveland, Ohio, a corporation of Ohio
Filed Feb. 2, 1966, Ser. No. 524,404
U.S. Cl. 198—36                12 Claims
Int. Cl. B65g 37/00, 17/12; E02f 3/18

ABSTRACT OF THE DISCLOSURE

A bulk material handling apparatus having an endless rotary excavating device with a plurality of digging containers supported to allow an endless bucket chain elevator to pass through the axial area of this rotary excavating device and interlock with it to provide a means to transfer bulk material from the buckets of the digging wheel to the buckets of the elevator.

---

This invention relates generally to bulk material handling apparatus and more particularly to apparatus having a rotary reclaiming or digging wheel combined with a bucket chain type conveyor for digging and picking up material from earth formations or the like, or from a pile or from a container, such as a hold of a barge or a ship, or from any other storage location or receptacle, and moving the material to another location. One important application for apparatus of this type is in deep holds of bulk cargo vessels.

Heretofore, where it has been necessary to remove material, the principal problem has been to gather the material and transport it vertically to horizontal transport means, the apparatus used has usually been either a bucket or scoop or else a bucket chain. The former, while slow, has been particularly adapted to dense or hard packed material while the latter tends to be limited to softer and less dense materials. When used with any but the softest and least dense materials, the bucket chain arrangement has a number of disadvantages. First, since the bucket chain itself performs the digging function, the entire bucket chain structure and its driving mechanism must be strong enough to withstand the digging forces. Second, since each bucket in the chain must dig as well as convey the speed of the conveyer is limited by its digging rate.

To overcome these disadvantages, the present invention utilizes a bucket type reclaiming or digging wheel which gathers and feeds the material into a bucket chain type conveyor. Since all of the digging forces are imposed upon the reclaiming or digging wheel, the bucket chain is required only to lift the loaded buckets and is, therefore, lighter and operates at a higher speed.

Another feature of this invention is to obtain greater control over the material as it passes from the reclaiming or digging wheel by running the conveyor through the lower portion of the wheel and utilizing a chute to channel and direct the material into the conveyor buckets. By controlling this flow, uniform filling of the buckets is obtained, and the conveyor may be smaller, lighter, and operate at a higher speed with the same material conveying rate. This reduction in the physical dimensions of the conveyor permits the reclaiming or digging wheel to be of a smaller diameter and permits the operator to get closer into the corners, thus, minimizing the hang-ups and the amount of material to be removed by the slower final clean up methods.

An important object of the present invention is to provide a novel bulk material handling system particularly adapted to operate in deep holds of bulk cargo vessels with a maximum degree of efficiency.

Another object of the present invention is to provide a novel bulk material handling system having separate digging or reclaiming means and high speed conveyor means so that each of these functions can be performed at maximum efficiency.

A further object of the present invention is to provide a novel bulk material handling system utilizing a reclaiming wheel in combination with a bucket chain type conveyor.

A still further object of the present invention is to provide a novel bulk material handling device having a combined reclaiming wheel and bucket chain type conveyor wherein the conveyor runs through the reclaiming wheel.

In the drawings:

FIGURE 2 is a side elevational view of the reclaiming or digging wheel of FIGURE 1 (i.e., looking in an axial direction);

FIGURE 3 is an end elevational view of the reclaiming or digging wheel (i.e., looking in a direction perpendicular to the wheel axis);

FIGURE 4 is a view similar to FIGURE 2, showing the digging wheel in partial cross section taken through the wheel perpendicular to its axis; and FIGURE 5 is a view similar to FIGURE 3, showing the digging wheel in partial cross section taken through the wheel in the plane of its axis.

Figure 1:
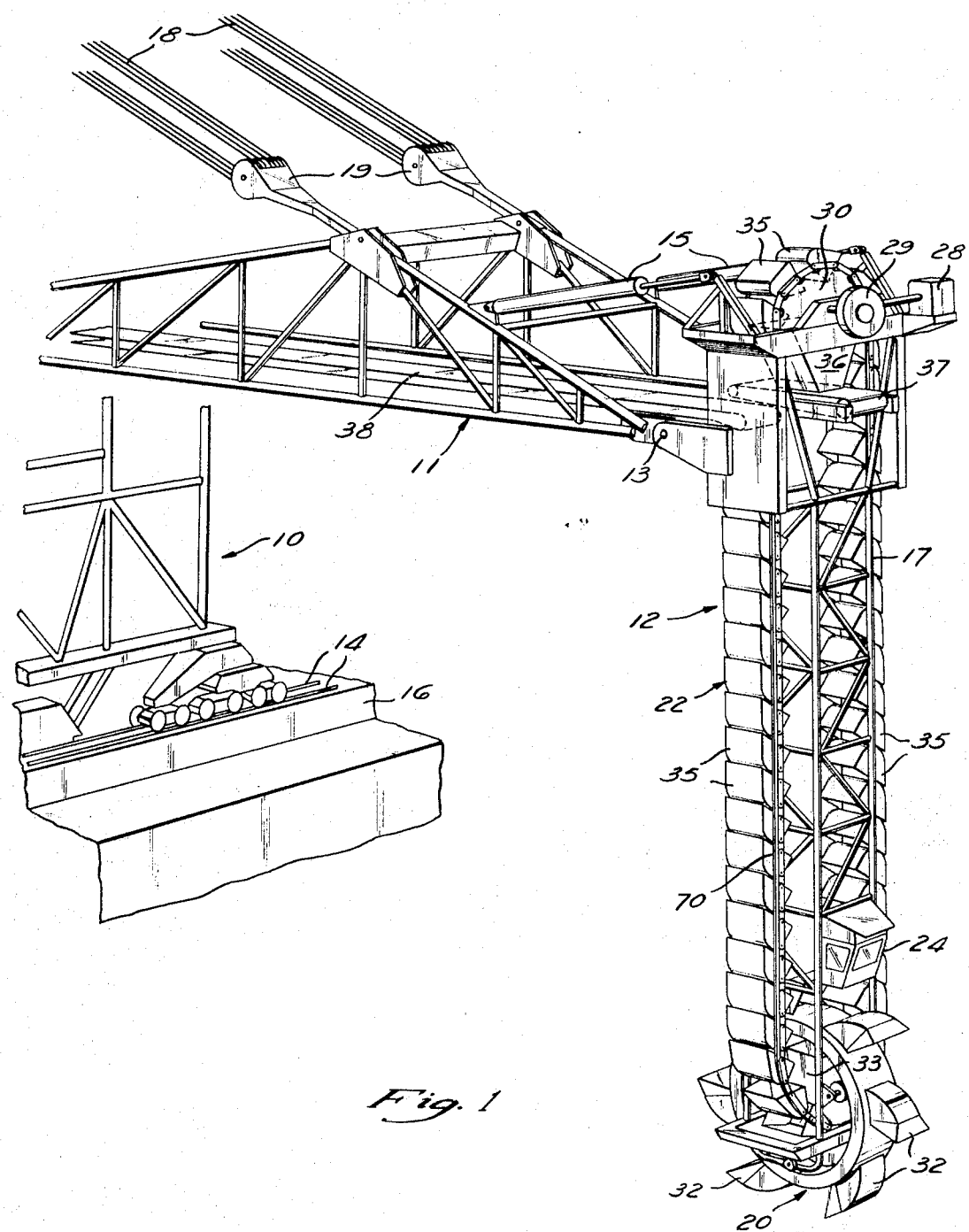
FIGURE 1 is a partial perspective view of an unloader incorporating the present invention.

Referring to the drawings in greater detail, FIGURE 1 shows an unloader for bulk cargo vessels including a truck mounted tower 10 which moves along a set of rails 14 on a dock 16, a movable boom 11 pivoted to the tower, and a vertical ladder 12 depending from the outer end of the boom 11. The ladder 12 is pivotally connected to the outer end of the bom 11 at the point 13 and pivoted about the point 13 by a pair of tilt cylinders 15. The boom 11 is raised and lowered by a hoist (not shown) connected to the boom through a set of hoist cables 18 reeved about a set of pulley blocks 19. The structure of the tower and boom is shown by way of illustration and will not be described in greater detail since it forms no further part of the present invention.

The ladder 12 includes a vertically extending structural frame 17 at the lower end of which is rotatably mounted an endless excavating means in the form of a reclaiming or digging wheel 20. An endless bucket chain conveyor or elevator 22 runs through the center of the wheel at the bottom of the ladder, up along the side of the frame 17 to the top of the ladder, and back down the opposite side of the frame to the wheel 20. In this manner, the closed circuits of the wheel 20 and the elevator 22 co-operate to form two interlocking closed loops.

In order that the operator may have an unobstructed view of the wheel 20 when it is in operation, an operator's cab 24 is located slightly above the wheel on the lower portion of the ladder frame 17. The reclaiming wheel 20 is driven by a pair of motors 26 secured to the frame 17 as shown in FIGURE 2 on opposite sides of the wheel. The elevator 22 is driven at its upper end by a motor 28 mounted on the top of the frame 17 and connected through a gear reduction unit 29 to a drive sprocket 30.

When the unloader is operating, bulk material is gathered by a plurality of buckets 32 spaced about the rim of the wheel 20 and dumped into a chute 33 within the wheel 20. From the chute 33, the material is deposited in the buckets 35 of the elevator 22 and lifted to the top of the ladder where it is dumped into a second chute 36. The chute 36 channels the material onto a short belt-type conveyor 37 mounted in the top of the ladder frame 17. The conveyor 37 in turn dumps the material onto a second belt-type conveyor 38 running the length of the boom 11 from which the material is transferred to other material handling equipment in the tower 10 and on the dock 16.

The reclaiming or digging wheel 20 is a cage-like structure including a pair of spaced rims 41 and 42 connected at their outer peripheries by a circumferential plate 43. Since the elevator 22 runs through the wheel 20, the wheel is supported by three pairs of trunnion rollers. Each trunnion roller pair includes two rollers 45 on opposite ends of a shaft 44 with the three shafts being spaced about the inner periphery of the rims 41 and 42. The roller shafts 44 are attached to the sides and bottom of the ladder frame 17 to allow the rollers 45 to engage the inner peripheral surfaces of a pair of roller races 46 and 47 secured to the inner surfaces of the rims 41 and 42.

Horizontal movement of the wheel 20 along its axis is restrained by a second group of trunnion rollers. This second group includes three equally spaced pairs of rollers 49 journaled about radial axes on the frame 17. The rollers 49 engage the vertical surfaces at the outer edges of the rims 41 and 42 as best shown in the upper portion of FIGURE 5.

The wheel 20 is driven by a pair of sprockets 50 mounted on one of the upper roller shafts 44 on the frame 17 which mate with sets of circumferentially spaced axially projecting pins 51 secured to the sides of the rims 41 and 42. The sprockets 50 are driven by the motors 26 through a universal shaft 54 and a gear reduction unit 55. Preferably, the motors are hydraulic for reasons of the compactness and light weight.

The buckets 32 extend through openings 57 in the circumferential plate 43 and are pivotally secured to the outer peripheries of the rims 41 and 42 adjacent their rearward edges at 58. This mounting arrangement allows the buckets to deflect vertically, as shown at 60 in FIGURE 4, should they strike the bottom of the hold or other rigid object. This actually permits the buckets to scrape clean the hold bottom. A C-shaped stop member 59 adjacent the forward edge of each bucket engages the plate 43 to limit the amount of deflection of the bucket in both directions.

A mouldboard 62 extends part way around the wheel 20 and forms a temporary closure for the open side of the buckets 32 to prevent spillage of the material as the buckets 32 move upwardly toward the chute 33 at the upper end of the wheel. The mouldboard 62 and chute 33 are both anchored to the frame 17. To prevent all of the material in each bucket from being dumped into the left hand side of the chute, vertical divider 64 is provided in the chute. Optionally, it is often desirable to provide the mouldboard 62 with a non-continuous portion 63 which extends part way over the chute 33 to further distribute the load.

The bucket chain elevator 22 includes a number of buckets 35 connected by a double bar link roller chain 67. The roller chain 67 is made up of pairs of links 68 pivotally connected at their ends. To prevent rotation of the elevator buckets 35, alternate links of the chain 67 are connected at two spaced points to the same side of each bucket.

As the elevator moves through a closed circuit extending from the reclaiming wheel 20 to the upper end of the ladder 12 and back to the reclaiming wheel, it is guided and stabilized by restricting the movement of the roller chain 67 within a fixed path. This is accomplished by providing a roller 69 at each joint between the links 68. The rollers 69 restrict the movement of the chain in one plane by engaging a pair of opposed races 70 defining two sides of the fixed path. Outward movement of the chain in the plane perpendicular to the first plane is restricted by a series of thrust rollers 71 located on alternate outer links of the chain which engage a third race 75 defining the third or outer side of the fixed path.

At the lower end of the elevator 22 the chain 67 passes over a pair of idler sprockets 72 rotatably secured to the frame 17 at a point slightly above the center line of the wheel 20 by a set of bearings 73, and the elevator buckets 35 pass through the reclaiming wheel 20 below its center line. By running the elevator 22 through the lower portion of the reclaiming wheel 20, there is sufficient space above the elevator to provide a chute 33 to control the flow of loose material into the buckets 35 and obtain a uniform filling of the elevator buckets. This not only permits the use of smaller and lighter elevator buckets and higher elevator speeds but also the use of a smaller diameter reclaiming wheel which enables the operator to get closer into the corners, thus, reducing the amount of material to be removed by the slower final cleanup methods.

To further control the filling of the buckets 35, the side 34 of the chute 33 lies at an angle with respect to the vertical. This deflects the material toward the side of the ladder where the buckets are oriented with the open side facing upward after passing the bottom center of the elevator circuit as best shown in FIGURE 5. To reduce spillage, a trough or pan-like member 74 is provided at the bottom of the ladder into which the buckets dip at their lowest point of travel. As the buckets 35 enter the trough 74, the lower lip 76 is positioned close to the bottom of the trough and scoops up any spilled material in the trough. To resist upward deflection of the lips 76 as the buckets pass through the trough 74 and to scrape material toward the bottom of the trough, a detent or scraper bar 77 is provided on one side of the bucket 35 adjacent the bottom or back which engages the bottom of the trough.

While the preferred embodiment of the invention has been described in considerable detail, it is to be understood that many rearrangements and modifications may be resorted to without departing from the scope of the invention as defined in the following claims.

What is claimed is:

1. A bulk material handling device comprising support means, a depending frame carried by said support means, an excavating wheel having inner and outer peripheries mounted on the lower end of said frame for rotation about an axis substantially perpendicular to the longitudinal axis of said frame, means on said frame rotatably supporting said wheel, drive means on said frame to rotate said wheel, said wheel including a plurality of excavating means mounted about its outer periphery and facing in the direction of rotation endless first conveyor means having a plurality of containers thereon mounted on said frame interlocked with and passing through said wheel to form closed loops whereby said containers enter said wheel from one side and exit therefrom on the other said conveyor means extending from within said wheel to a point above the wheel, whereby rotation of said excavating wheel causes said excavating means to loosen and gather the bulk material and dump it into the containers of said first conveyor means.

2. A device as set forth in claim 1 wherein said first conveyor means runs to the top of the frame and back down to the wheel.

3. A device as set forth in claim 1 wherein a chute is mounted on the lower end of the frame and said excavating means carries the loose material substantially to the top of the wheel and dumps it into said chute which channels the material into the containers of said first conveyor means.

4. A device as set forth in claim 1 including a separate drive means for said first conveyor.

5. A device as set forth in claim 2 wherein said first conveyor is of the bucket chain type.

6. A device as set forth in claim 3 wherein an arcuate mouldboard is provided on the wheel radially inwardly of the excavating means and extends from substantially the bottom of the wheel to the chute, the upper end of said mouldboard having a discontinuous portion extending over said chute to uniformly distribute the flow of loose material into the containers of said first conveyor means.

7. A device as set forth in claim 3 wherein a divider is provided in said chute to separate the flow of loose material and distribute it uniformly into the containers of said first conveyor means.

8. A device as set forth in claim 1 wherein said support means comprises a roller race about the inner periphery of the wheel and a first set of circumferentially spaced trunnion rollers engaging the inner surface of said roller race and a set of circumferentially spaced trunnion rollers engaging a surface on said support means perpendicular to said inner surface of said roller race to support said wheel against axial translation.

9. A device as set forth in claim 3 wherein one side of said chute is disposed at an angle with respect to the longitudinal axis of said ladder to direct the loosened material into the containers of said first conveyor means after the containers have passed the bottom center of the conveyor circuit.

10. A device as set forth in claim 1 wherein an upwardly opening trough-like structure is provided at the lower end of said ladder below said chute into which the containers of said first conveyor means pass.

11. A device as set forth in claim 1 wherein a second conveyor means is provided at the top of said ladder to receive the loosened material from the containers of said first conveyor means.

12. Bulk material handling apparatus comprising an endless excavating means for loosening and picking up bulk material and endless conveying means for receiping the loosened material from said excavating means, the closed circuits of said endless excavating means and said endless conveying means forming two interlocking closed loops, each of said endless means having a plurality of individual material containing elements thereon.

References Cited

UNITED STATES PATENTS

| | | | |
|---|---|---|---|
| 655,955 | 8/1900 | Brophy | 37—97 |
| 777,235 | 12/1904 | Abraham | 198—102 |
| 1,245,675 | 11/1917 | Caceres | 37—190 |
| 1,776,420 | 9/1930 | Eichenberger | 198—103 |
| 2,210,093 | 8/1940 | Morrissey | 198—103 XR |
| 2,232,431 | 2/1941 | Bilocg | 198—103 XR |
| 2,358,289 | 9/1944 | Kendall et al. | 198—103 |
| 2,916,135 | 12/1959 | Likens | 37—8 XR |
| 3,280,487 | 10/1966 | Thomas et al. | 37—190 |
| 3,307,717 | 3/1967 | Ludwig | 214—14 |

FOREIGN PATENTS

| | | |
|---|---|---|
| 779,944 | 4/1935 | France. |

ROBERT E. PULFREY, *Primary Examiner.*

CLIFFORD D. CROWDER, *Assistant Examiner.*

U.S. Cl. X.R.

198—103; 37—190